US008037252B2

(12) United States Patent
Toussi

(10) Patent No.: US 8,037,252 B2
(45) Date of Patent: *Oct. 11, 2011

(54) METHOD FOR REDUCING COHERENCE ENFORCEMENT BY SELECTIVE DIRECTORY UPDATE ON REPLACEMENT OF UNMODIFIED CACHE BLOCKS IN A DIRECTORY-BASED COHERENT MULTIPROCESSOR

(75) Inventor: Farnaz Toussi, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/845,812

(22) Filed: Aug. 28, 2007

(65) Prior Publication Data

US 2009/0063782 A1    Mar. 5, 2009

(51) Int. Cl.
*G06F 12/00* (2006.01)
(52) U.S. Cl. ........ 711/141; 711/135; 711/144; 711/145; 711/154

(58) Field of Classification Search .................. 711/141
See application file for complete search history.

(56) References Cited

U.S. PATENT DOCUMENTS

| 5,781,560 | A  | * | 7/1998  | Kawano et al. ............... 714/727 |
| 6,141,692 | A  | * | 10/2000 | Loewenstein et al. ........ 709/234 |
| 6,338,123 | B2 |   | 1/2002  | Joseph et al. |
| 6,775,748 | B2 | * | 8/2004  | Jamil et al. .................... 711/145 |
| 6,859,864 | B2 |   | 2/2005  | Khare et al. |
| 6,901,485 | B2 | * | 5/2005  | Arimilli et al. ............... 711/135 |
| 7,272,688 | B1 | * | 9/2007  | Glasco .......................... 711/141 |
| 2006/0143408 | A1 | * | 6/2006 | Sistla ............................ 711/145 |
| 2009/0063771 | A1 |   | 3/2009 | Toussi |

* cited by examiner

*Primary Examiner* — Kevin L Ellis
*Assistant Examiner* — Kalpit Parikh
(74) *Attorney, Agent, or Firm* — Patterson & Sheridan, LLP

(57) ABSTRACT

Embodiments of the present invention generally provide techniques and apparatus to reduce the number of memory directory updates during block replacement in a system having a directory-based cache. The system may be implemented to utilize a read/write bit to determine the accessibility of a cache line and limit memory directory updates during block replacement to regions that are determined to be readable and writable by multiple processors.

17 Claims, 5 Drawing Sheets

METHOD FOR REDUCING COHERENCE ENFORCEMENT BY SELECTIVE DIRECTORY UPDATE ON REPLACEMENT OF UNMODIFIED CACHE BLOCKS IN A DIRECTORY-BASED COHERENT MULTIPROCESSOR

BACKGROUND OF THE INVENTION

1. Field of the Invention

Embodiments of the present invention generally relate to the field of computer processing and more specifically relates to a method and apparatus to reduce directory updates to a directory-based cache.

2. Description of the Related Art

In a system containing numerous processors and distributed memory, directory-based cache, coherence schemes are often used to maintain cache coherency between processors.

SUMMARY OF THE INVENTION

One embodiment provides a system including multiple processors, each having their own cache and cache directory, coupled with a memory and memory directory via a system interconnect. The memory directory includes a dirty bit, presence bits (one for each processor in the system) and a read/write bit. The cache directory includes tag bits, state bits and a read/write bit. The read/write bit is set by logic that determines if a cache line has been read by more than one processor and written to by at least one processor. During a block replacement, a processor will only update the presence bits if either the block its replacing is modified, or if the read/write bit associated with that block is set, thus updating the directory when there is a potential coherence enforcement, for example during invalidation requests by other processors. This mechanism will reduce the number of invalidations and directory updates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide techniques that reduce the frequency of directory updates in a directory-based cache system. Embodiments may utilize a read/write (R/W) bit for each block of memory (cache line) to control when processors update a memory directory. As will be described in detail below, when replacing an unmodified block in its local cache, a processor may only update the cache directory when the R/W bit indicates that block has been accessed by multiple processors and written to by at least one processor. Limiting the number of directory updates in this manner may improve performance by preventing unnecessary invalidate requests.

Figure 1:
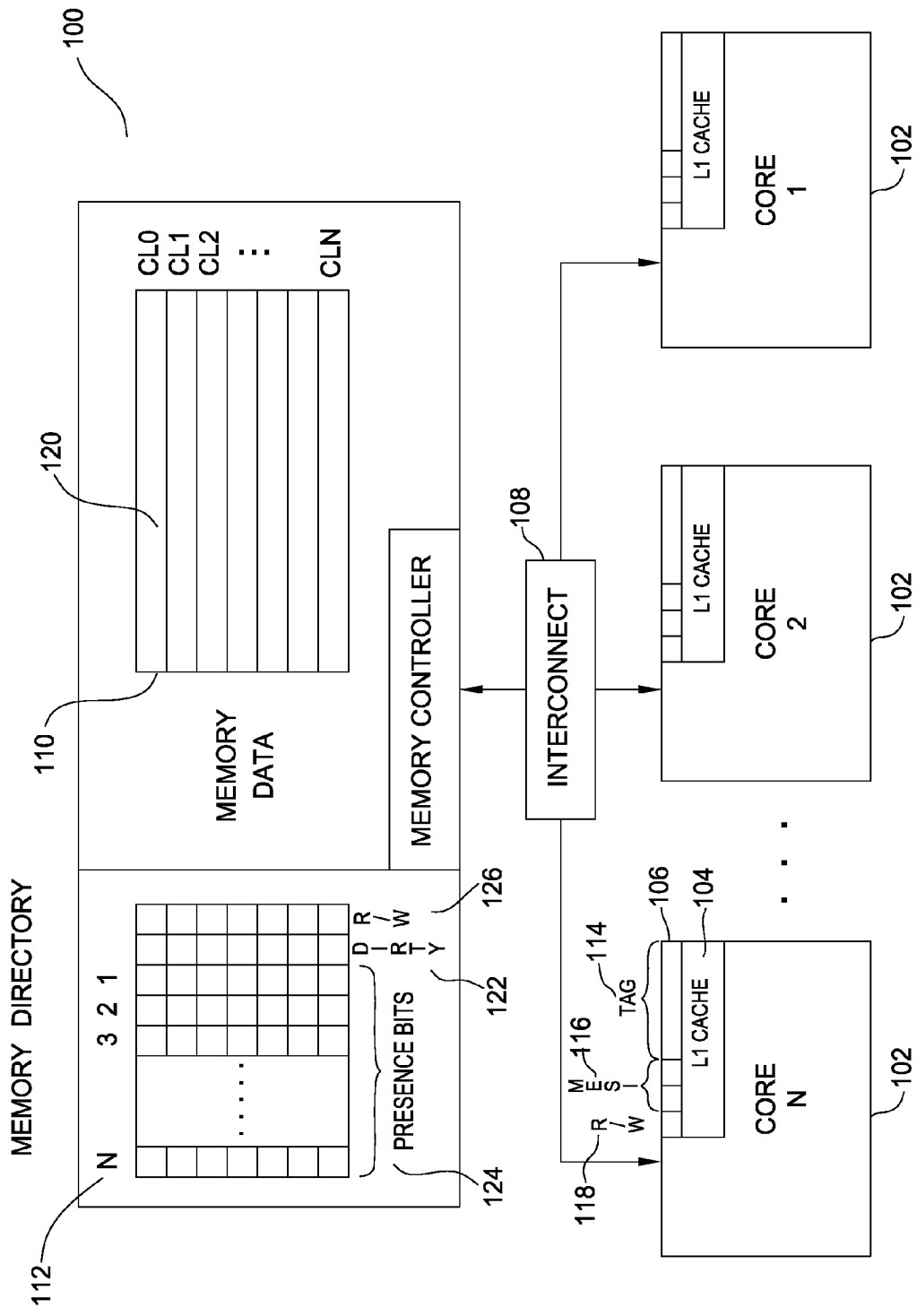
FIG. 1 is illustrates one embodiment of a system with a directory-based cache.

FIG. 1 is a block diagram illustrating an embodiment of a multiprocessor system in a Uniform Memory Access (UMA) configuration 100, including at least two processors 102, each having a cache 104 and a cache directory 106, and a system interconnect 108 that couples the processors 102 with a memory 110 and a memory directory 112. The multiprocessor system may also be placed in a Non-Uniform Memory Access (NUMA) configuration, where the system of FIG. 1 is considered a node, and at least two nodes are connected to each other via a system interconnect.

The cache 104 in each processor 102 may store copies of data (cache lines) located in the memory 110. The cache directory 106 may contain entries, which may include tag bits 114, state bits 116, and a read/write (R/W) bit 118 (discussed below), for each cache line stored in the cache 104. The tag bits 114 may be part of the memory address which identify memory blocks (in memory 110) that map to the same cache block. The state bits 116 represent the state in which the cache line is in. For example, in one embodiment, the state of a cache line may be determined by a MESI protocol, where the cache may be represented by one of four states ("M" (Modified), "E" (Exclusive), "S" (Shared) or "I" (Invalid)).

The memory 110 of the system 100 may consist of a plurality of memory blocks (cache lines) 120. The memory directory 112 may contain entries, which can include a dirty bit 122, which represents if cache line is in a Modified state, presence bits 124 (one for each processor in the system), and a R/W bit 126 for each cache line 120 in the memory 110.

The presence bits 124 represent which processor or processors 102 have a copy of the cache line 120 stored in its cache 104. A presence bit 124 can be set anytime a processor 102 associated with the bit reads a cache line 120 from memory 110, for example during a cache miss. The presence bits 124 can be reset whenever the cache line is invalidated by another processor 102. Furthermore, the presence bit 124 can also be reset during a block replacement. In particular, if a block being replaced is either in a Modified state or associated with a region of memory that has been read by at least two processors and written by at least one processor, the presence bit 124 can be reset during a block replacement. The accessibility of the cache line 120 can be determined by the R/W bit 126.

As stated above, The R/W bit 126 represents if a particular cache line 120 has been read by at least two processors and written by at least one processor 102. In one embodiment, the R/W bit 126 may be set by logic internal to the memory directory. For another embodiment, the R/W bit 126 may be set by logic external to the memory directory.

Figure 2:
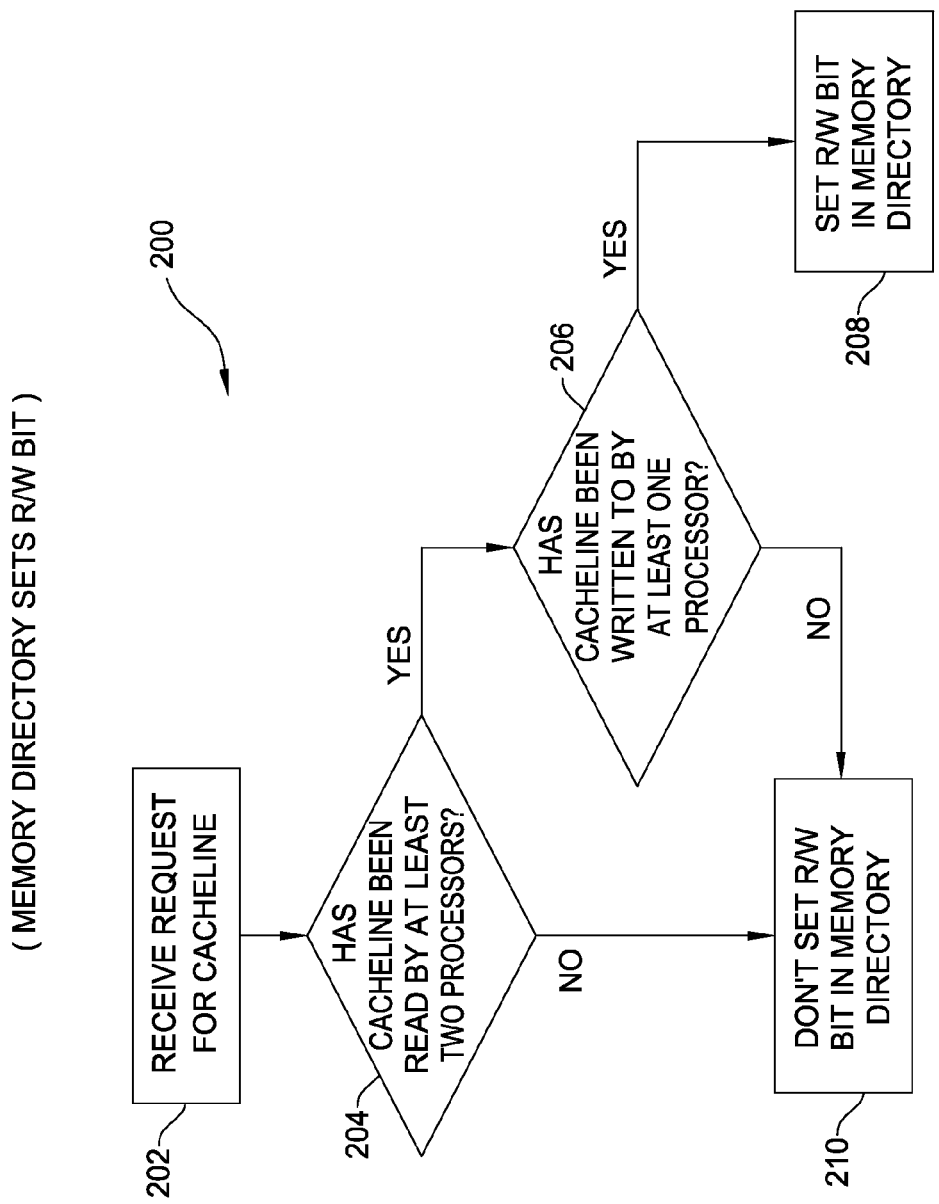
FIG. 2 is a flow diagram of example operations for setting a read/write bit in the directory-based cache

FIG. 2 illustrates a set of operations 200 where the logic sets the R/W in the memory directory. At step 202, for every cache line request received, the logic keeps track of the type of transaction (read or write) and which processor is accessing the cache line. Once it is determined that the cache line has been read by at least two processors, at step 204, and written to by at least one processor, at step 206, the logic sets the R/W bit in the memory directory, at step 208. However, if either of these two conditions is not true, at step 210, the R/W is left unset.

In one embodiment, if a R/W bit is set, it can remain set and may never be reset. For another embodiment, the R/W may be reset based on a threshold value that may be set either dynamically or statically.

As stated earlier, the R/W bit, along with its associated cache line, may be sent to a requesting processor on a cache miss. Subsequently, on a block replacement of an unmodified block, the processor may decide to send a directory update request to the memory directory (to update the presence bits) only if the R/W bit associated with that block is set. Typically, a processor sends an update request every time it replaces a block, regardless if it's modified or not. In cases where the updates are to regions of memory that are generally read-only, it is unnecessary to maintain an accurate record of which processor(s) have a copy of the cache line. As a result, sending directory update requests in these situations causes unnecessary bus traffic. Therefore, by limiting the number of directory updates to regions of memory that have been read to and written to by multiple processors, bus performance can be improved.

Figure 3A:
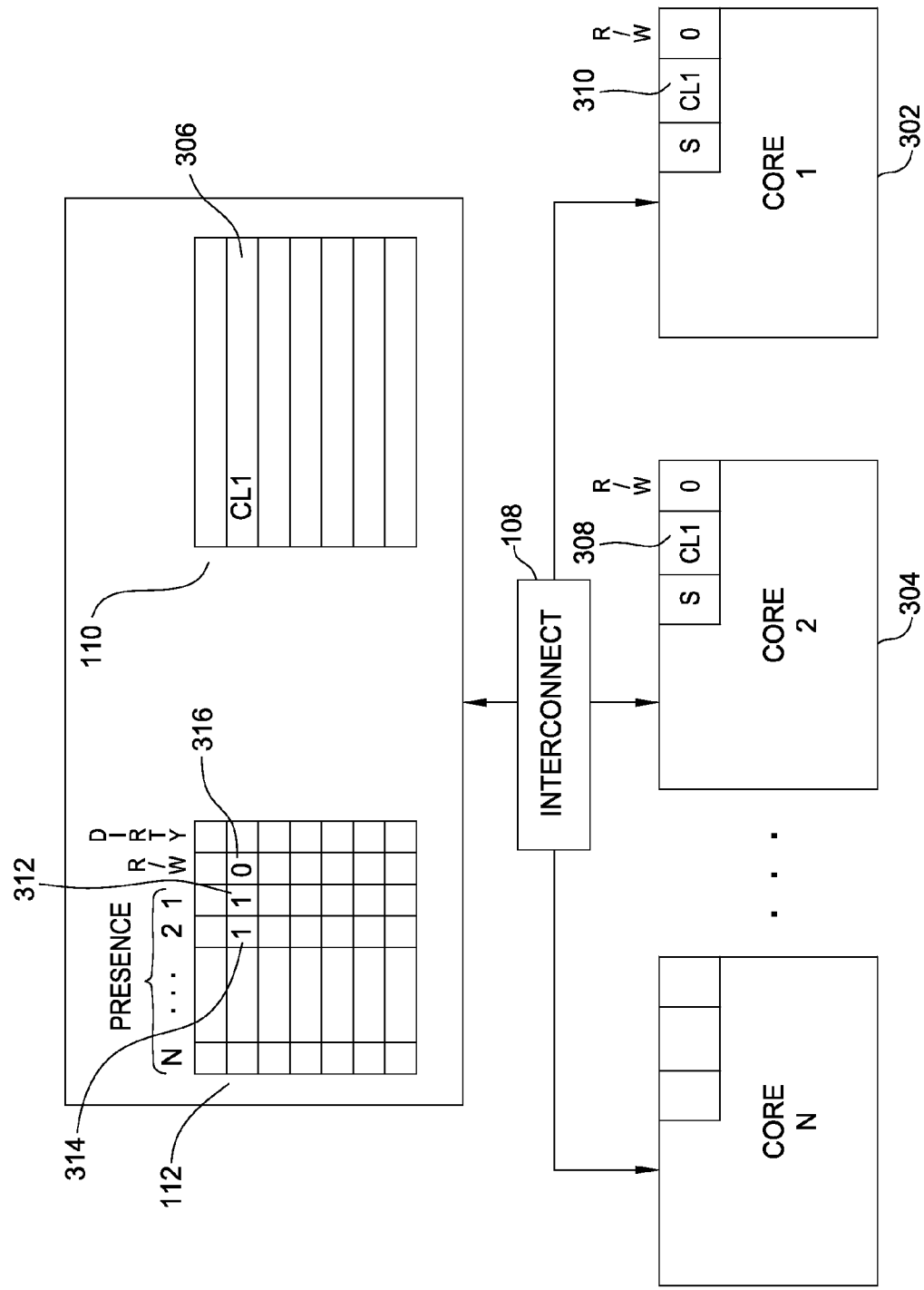
FIGS. 3A and 3B illustrate updating the read/write bit in the directory-based cache system.
Figure 3B:
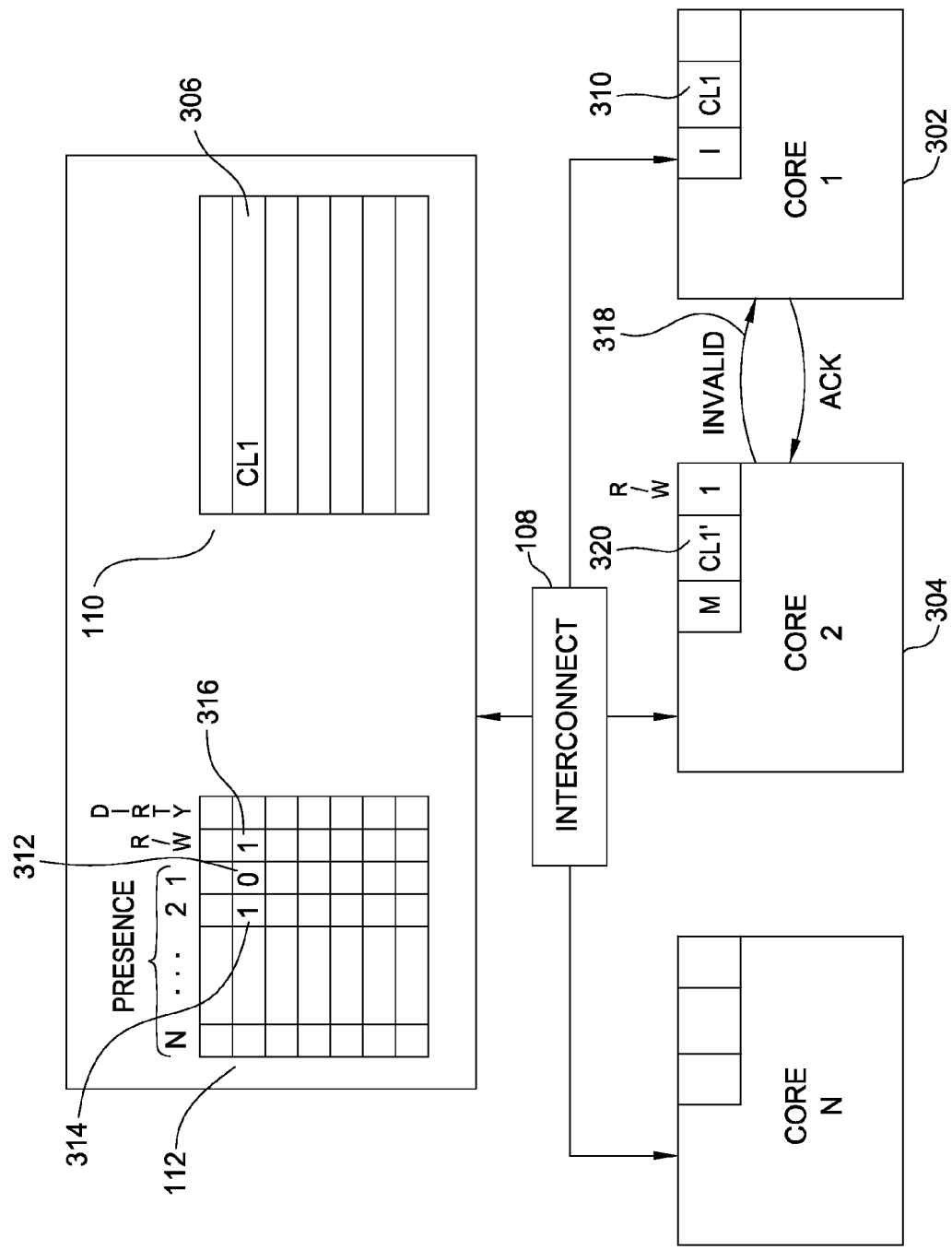

FIGS. 3A and 3B illustrate the system in reference to FIG. 1. In particular, the figures illustrate how the R/W bit is set in the system. FIG. 3A illustrates the situation where Processor 1 (P1) 302 and Processor 2 (P2) 304 have read and stored Cache Line 1 306 in each of their caches 308, 310. As a result, presence bits 1 and 2 (312, 314) for CL1 306 have been set. The R/W bit 316 is set to 0 because a processor has not yet written to CL1 306.

Subsequent to the two reads, as shown in FIG. 3B, P2 304 intends to locally modify CL1 306. Initially, P2 304 can send a request to the memory directory. The directory can then send an invalidate request to P1 302 to invalidate 318 P1's 302 copy of CL1 310. Thereafter, logic in the memory directory 112 can set the R/W bit 316 and ownership of the block can be granted to P2 304 by sending a message to P2. The message also indicates that R/W bit of CL1 in P2 should be set since CL1 306 has been read by more than one processor (the two subsequent reads in FIG. 3A) and has been written by at least one processor. Furthermore, the presence bit for P1 312 is cleared because P2 304 has locally modified CL1' 320 and invalidated the copy in P1 302.

Figure 4:
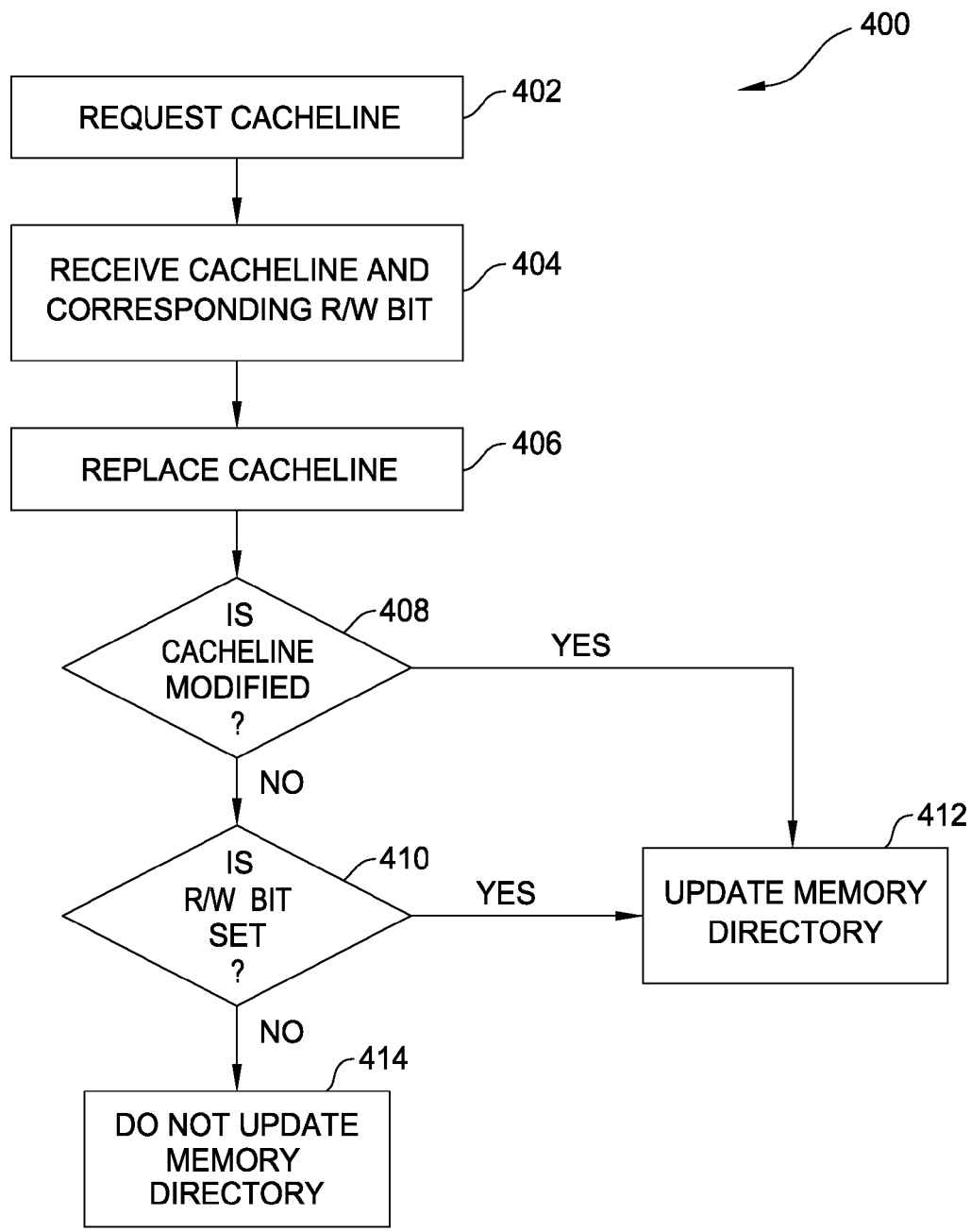
FIG. 4 is a flow diagram of example operations for updating the presence bits in the directory-based cache.

FIG. 4 is a flow diagram of example operations that show how the R/W bit may be used to limit the updating of the cache directory, which may lead to improved performance. The operations begin, for example, when the processor requests data from memory, at step 402. Responding to the request, at step 404, the memory can transfer the data, along with the R/W bit, to the processor. At a later point in time, at step 406, the processor may need to replace the cache line. If so, at step 412, the processor may reset the presence bit if it is determined that the cache line has been modified by the processor, at step 408, or if the R/W bit has been set, at step 410. If the data has not been modified and the R/W has not been set, the processor, at step 414, may not update the memory directory.

While the foregoing is directed to embodiments of the present invention, other and further embodiments of the invention may be devised without departing from the basic scope thereof, and the scope thereof is determined by the claims that follow.

The invention claimed is:

1. A system, comprising:
    a memory having a plurality of memory blocks;
    a memory directory having a read/write bit associated with each memory block of the plurality of memory blocks and logic configured to set the read/write bit when the memory block associated with the read/write bit has been read by more than one processor and written by at least one other processor and presence bits associated with each memory block of the plurality of memory blocks that indicate which processors have or have had a copy of the associated memory block; and
    at least two processors, wherein each processor includes a cache to store one or more memory blocks of the plurality of memory blocks as cache lines and logic configured to update the presence bits in the memory directory when replacing an unmodified one of the cache lines in the cache of the processor only when the associated read/write bit is set.

2. The system of claim 1, wherein a value of the read/write bit associated with the memory block is sent to a processor accessing the memory block.

3. The system of claim 1, wherein the at least two processors are within the same chip.

4. The system of claim 1, wherein the system is placed in a Uniform Memory Access (UMA) configuration.

5. The system of claim 1, wherein the logic configured to set the read/write bit is located external to the memory directory.

6. A method for reducing directory updates to a memory directory in a directory-based cache system comprising:
    requesting a memory block from a memory by a processor;
    receiving the memory block and storing the memory block as a cache line in a cache of the processor;
    receiving a read/write bit, located in a memory directory and associated with the memory block, wherein the read/write bit is set when the memory block associated with the read/write bit has been read by more than one processor and written by at least one processor; and
    updating a presence bit, located in the memory directory and associated with the memory block, upon replacing an unmodified cache line in the cache of the processor only when the associated read/write bit is set, to indicate the processor no longer has a copy of the memory block in the processor's cache, wherein the unmodified cache line corresponds to the memory block.

7. The method of claim 6, wherein the processor requesting the memory block comprises of at least two processor cores.

8. The method of claim 6, wherein the read/write bit is set by logic internal to the memory directory.

9. The method of claim 6, wherein the read/write bit is set by logic external to the memory directory.

10. The method of claim 6, wherein once the read/write bit is set, it can remain set and never be reset.

11. The method of claim 6, wherein the read/write bit is reset based on a threshold value that may be set dynamically or statically.

12. A method for setting the accessibility of a memory block comprising:
    receiving a request for a memory block by a requesting processor;
    setting a read/write bit in a memory directory associated with the memory block if the memory block has been read by more than one processor and written by at least one processor;
    sending the memory block and the read/write bit associated with the memory block to the requesting processor; and
    updating a presence bit, located in the memory directory, upon replacing an unmodified cache line in a cache of the requesting processor only when the associated read/write bit is set, to indicate the requesting processor no longer has a copy of the memory block in the requesting processor's cache, wherein the unmodified cache line corresponds to the memory block.

13. The method of claim 12, wherein the processor requesting the data comprises of at least two processing cores.

14. The method of claim 12 wherein the read/write bit is set by logic internal to the memory directory.

15. The method of claim 12, wherein the read/write bit is set by logic external to the memory directory.

16. The method of claim 12, wherein once the read/write bit is set, it can remain set and never be reset.

17. The method of claim 12, wherein the read/write bit is reset based on a threshold value that may be set dynamically or statically.

\* \* \* \* \*